(12) United States Patent
Yanagihara et al.

(10) Patent No.: US 11,128,006 B2
(45) Date of Patent: Sep. 21, 2021

(54) SPACER, BATTERY PACK, AND METHOD FOR MANUFACTURING BATTERY PACK

(71) Applicant: Nissan Motor Co., Ltd., Yokohama (JP)

(72) Inventors: Yasuhiro Yanagihara, Kanagawa (JP); Masayuki Nakai, Kanagawa (JP)

(73) Assignee: Envision AESC Japan Ltd., Zama (JP)

( * ) Notice: Subject to any disclaimer, the term of this patent is extended or adjusted under 35 U.S.C. 154(b) by 112 days.

(21) Appl. No.: 16/336,503

(22) PCT Filed: Oct. 27, 2017

(86) PCT No.: PCT/JP2017/038943
§ 371 (c)(1),
(2) Date: Mar. 26, 2019

(87) PCT Pub. No.: WO2018/084088
PCT Pub. Date: May 11, 2018

(65) Prior Publication Data
US 2020/0381685 A1      Dec. 3, 2020

(30) Foreign Application Priority Data

Nov. 7, 2016   (JP) .............................. JP2016-217510

(51) Int. Cl.
*H01M 50/20*   (2021.01)
*H01M 50/209*   (2021.01)
(Continued)

(52) U.S. Cl.
CPC ......... *H01M 50/20* (2021.01); *H01M 50/209* (2021.01); *H01M 50/502* (2021.01);
(Continued)

(58) Field of Classification Search
CPC ... H01M 2/1077; H01M 2/1061; H01M 2/204
See application file for complete search history.

(56) References Cited

U.S. PATENT DOCUMENTS

2007/0141457 A1*  6/2007  Amagai ................. H01M 2/18
429/152

FOREIGN PATENT DOCUMENTS

| CN | 102422464 A | 4/2012 |
|----|-------------|--------|
| CN | 108352489 A | 7/2018 |

(Continued)

*Primary Examiner* — Tae-Sik Kang
(74) *Attorney, Agent, or Firm* — Global IP Counselors, LLP

(57) ABSTRACT

A spacer (first spacer 114) has an insulating property, is used in a battery pack 100, obtained by electrically interconnecting unit cells 110 that are stacked one atop another, by means of a bus bar 132 along the stacking direction (Z direction) of the unit cells, each having a cell body 110H, which includes a power-generating element 111 and is formed in a flat shape, and an electrode tab 112, which is drawn out from the cell body 110H and whose distal end portion 112d is folded along the thickness direction of the cell body 110H; and is provided between each of the unit cells. The first spacer has an abutting portion 114h, a recessed portion 114i, and a communicating portion 114j. The abutting portion abuts the distal end portion of the electrode tab along the stacking direction of the unit cells. The recessed portion is recessed in a direction intersecting the stacking direction of the unit cells so as to be separated from the distal end portion of the electrode tab. The communicating portion allows an inner side of the recessed portion to communicate with the outside of the recessed portion.

15 Claims, 10 Drawing Sheets

(51) Int. Cl.
  *H01M 50/502*  (2021.01)
  *H01M 50/543*  (2021.01)
  *H01M 50/572*  (2021.01)

(52) U.S. Cl.
  CPC ....... *H01M 50/543* (2021.01); *H01M 50/572* (2021.01); *H01M 2200/00* (2013.01); *H01M 2220/20* (2013.01)

(56) References Cited

FOREIGN PATENT DOCUMENTS

| | | |
|---|---|---|
| JP | 2004-63347 A | 2/2004 |
| JP | 2010-161044 A | 7/2010 |
| JP | 2012-123980 A | 6/2012 |
| JP | 2012-186342 A | 9/2012 |
| JP | 2016-119377 A | 6/2016 |
| KR | 10-2016-0077765 A | 7/2016 |
| WO | 2016/105169 A1 | 6/2016 |

\* cited by examiner

SPACER, BATTERY PACK, AND METHOD FOR MANUFACTURING BATTERY PACK

CROSS-REFERENCE TO RELATED APPLICATIONS

This application is a U.S. national stage application of International Application No. PCT/JP2017/038943, filed on Oct. 27, 2017, which claims priority to Japanese Patent Application No. 2016-217510 filed on Nov. 7, 2016. The entire contents of Japanese Patent Application No. 2016-217510 is hereby fully incorporated herein by reference.

BACKGROUND

Technical Field

The present invention relates to a spacer, a battery pack, and a method for manufacturing the battery pack.

Background Information

Conventionally, there has been a battery pack (one form of which is a battery module) that is, for example, mounted in a vehicle such as an electric vehicle and used as a power source for driving a vehicle motor. The battery pack is configured by stacking unit cells (batteries) using spacers (battery holder). Electrode tabs of the different unit cells are electrically interconnected by means of a bus bar (refer to Japanese Laid-Open Patent Application No. 2004-63347).

SUMMARY

When the bus bar and the electrode tabs of the unit cell are laser-welded in a state in which the unit cell is attached to the spacer, a portion of the spacer that is heated by laser light may evaporate and generate gas. If gas mixes into a welded portion between the bus bar and the electrode tabs of the unit cell, there is the risk of decreasing the mechanical strength of the welded portion and increasing the electrical resistance.

An object of the present invention is to provide a spacer, a battery pack, and a method for manufacturing a battery pack with which it is possible to prevent the increase in electrical resistance and the reduction in the mechanical strength at the welded portion between the bus bar and the electrode tabs of the unit cell.

An insulating spacer which achieves the object described above is used in a battery pack, obtained by electrically interconnecting unit cells, which are stacked one atop another, by means of a bus bar along the stacking direction of the unit cells, each of which has a cell body including a power-generating element formed in a flat shape and an electrode tab extending out from the cell body with a distal end portion bent along the thickness direction of the cell body; and is provided between each of the unit cells. The spacer has an abutting portion, a recessed portion, and a communicating portion. The abutting portion abuts the distal end portion of the electrode tab along the stacking direction of the unit cells. The recessed portion is recessed in a direction intersecting with the stacking direction of the unit cells so as to be separated from the distal end portion of the electrode tab. The communicating portion communicates an inner side of the recessed portion with an outside of the recessed portion.

The battery pack which achieves the object described above comprises a plurality of unit cells that are stacked one atop another, a plurality of spacers, and a bus bar. The unit cell comprises a cell body including a power-generating element formed in a flat shape and an electrode tab extending out from the cell body with a distal end portion bent along a thickness direction of the cell body. The spacer has an insulating property and comprises an abutting portion that abuts the distal end portion of the electrode tab along the stacking direction of the unit cells, a recessed portion that is recessed in a direction intersecting with the stacking direction of the unit cells so as to be separated from the distal end portion of the electrode tab, and a communicating portion that communicates an inner side of the recessed portion with outside of the recessed portion. The bus bar electrically interconnects the distal end portions of the electrode tabs of the different unit cells.

A method for manufacturing the battery pack which achieves the object described above comprises arranging the spacer described above between a plurality of unit cells each including a cell body having a power-generating element formed in a flat shape, and an electrode tab extending out from the cell body with a distal end portion bent along a thickness direction of the cell body. Furthermore, the bus bar that electrically interconnects the distal end portions of the electrode tabs of the different unit cells is brought into contact with the distal end portion of each of the electrode tabs. Furthermore, laser light for welding is irradiated on the bus bar correspond to positions of recessed portions of the spacer in order to weld the bus bar and the distal end portions of the unit cell.

DETAILED DESCRIPTION OF THE EMBODIMENTS

Figure 1:
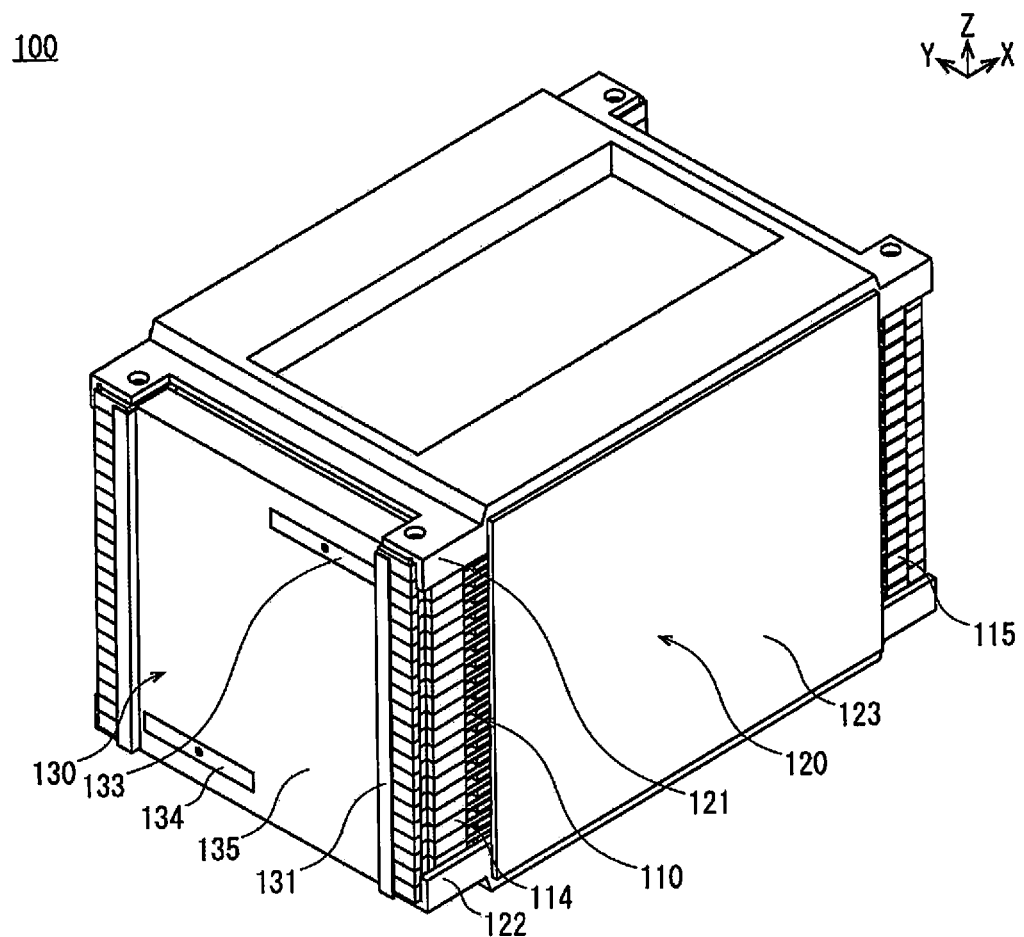
FIG. 1 is a perspective view illustrating a battery pack according to an embodiment.

The first to third embodiments of the present invention will be described below with reference to the appended drawings. In the drawings, the same members have been assigned the same reference symbols and redundant explanations have been omitted. In the drawings, the sizes and proportions of the members have been exaggerated for ease of understanding the first to third embodiments and may differ from the actual sizes and proportions.

The orientation of a battery pack 100 is shown using arrows indicated by X, Y, and Z in each of the drawings. The direction of the arrow indicated by X is the longitudinal direction of the battery pack 100. The direction of the arrow indicated by Y is the transverse direction of the battery pack 100. The direction of the arrow indicated by Z is the stacking direction of the battery pack 100.

Figure 2:
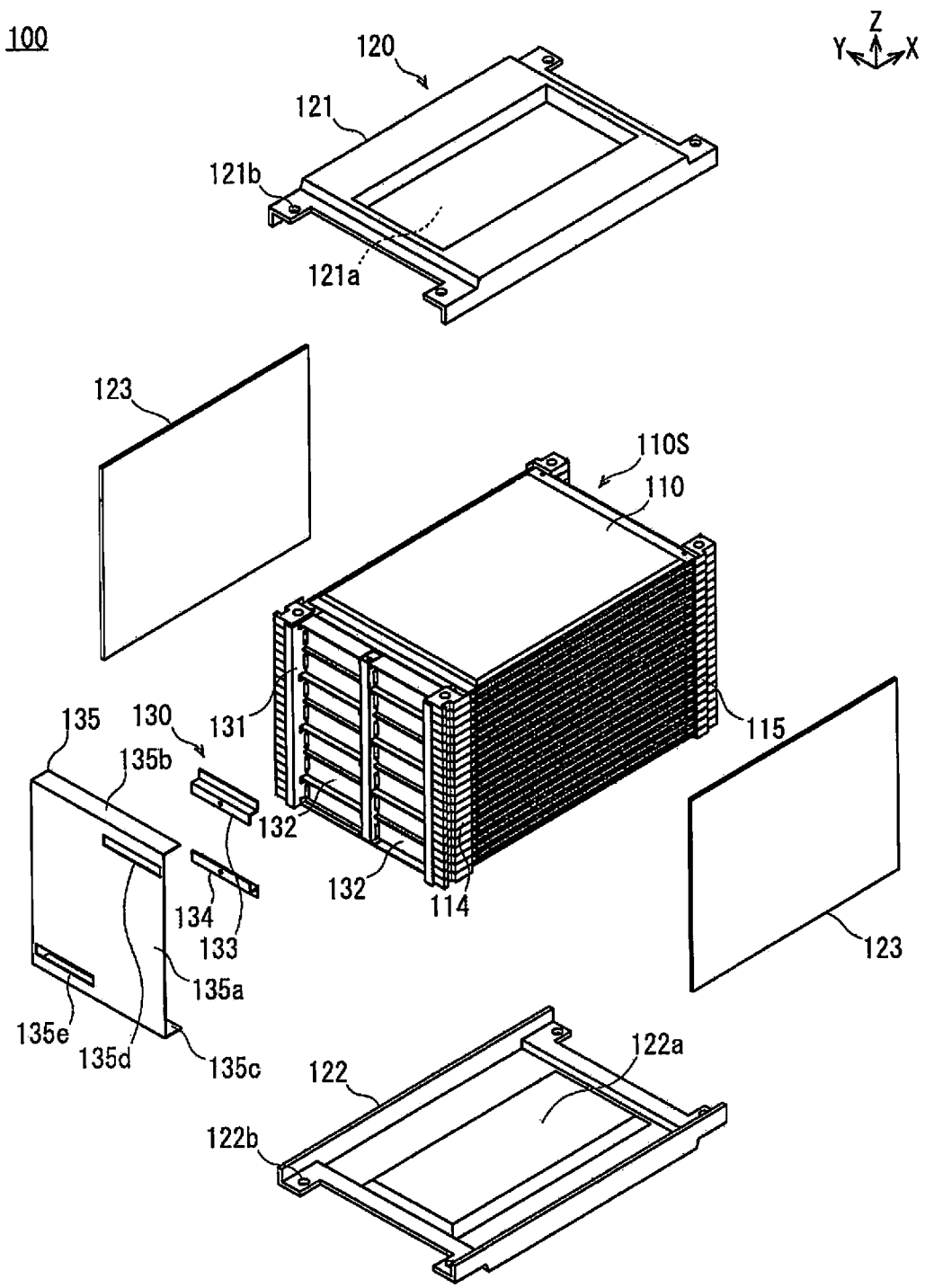
FIG. 2 is a perspective view illustrating a state in which a portion of a bus bar unit (a protective cover, an anode side terminal, and a cathode side terminal) as well as a pressurizing unit (an upper pressure plate, a lower pressure plate, and left and right side plates) are removed from the battery pack shown in FIG. 1.
Figure 3A:
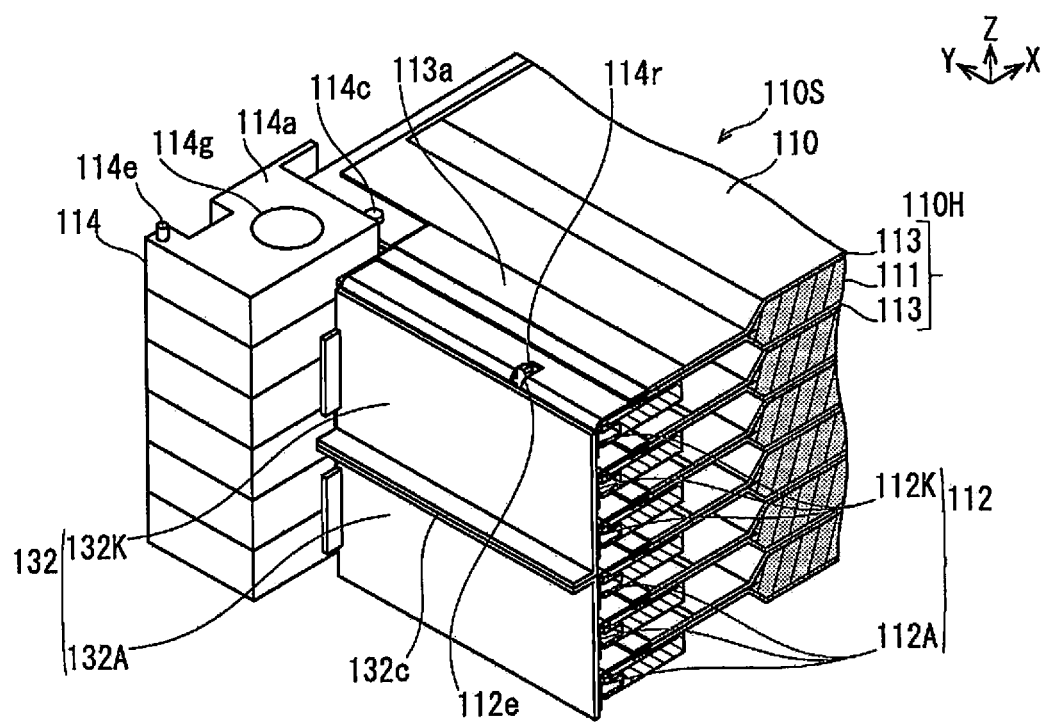
FIG. 3A is a perspective view illustrating a cross section of a main part of a state in which a bus bar is joined to electrode tabs of stacked unit cells.
Figure 3B:
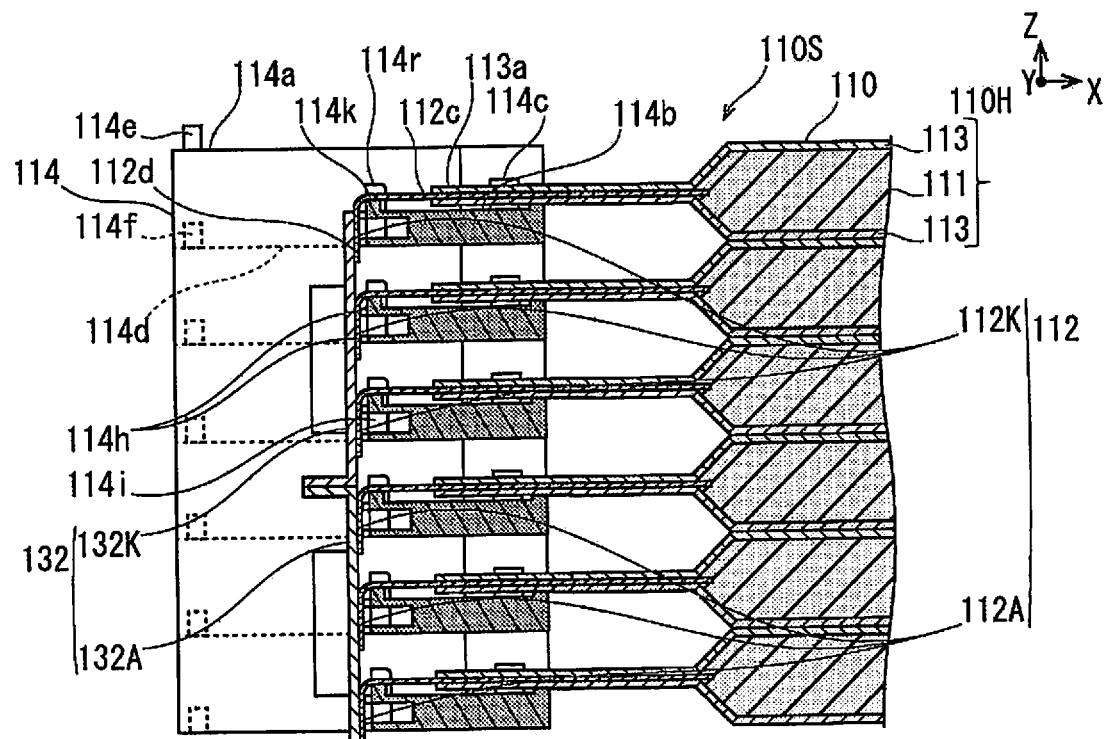
FIG. 3B is an end surface view illustrating FIG. 3A from the side.
Figure 4:
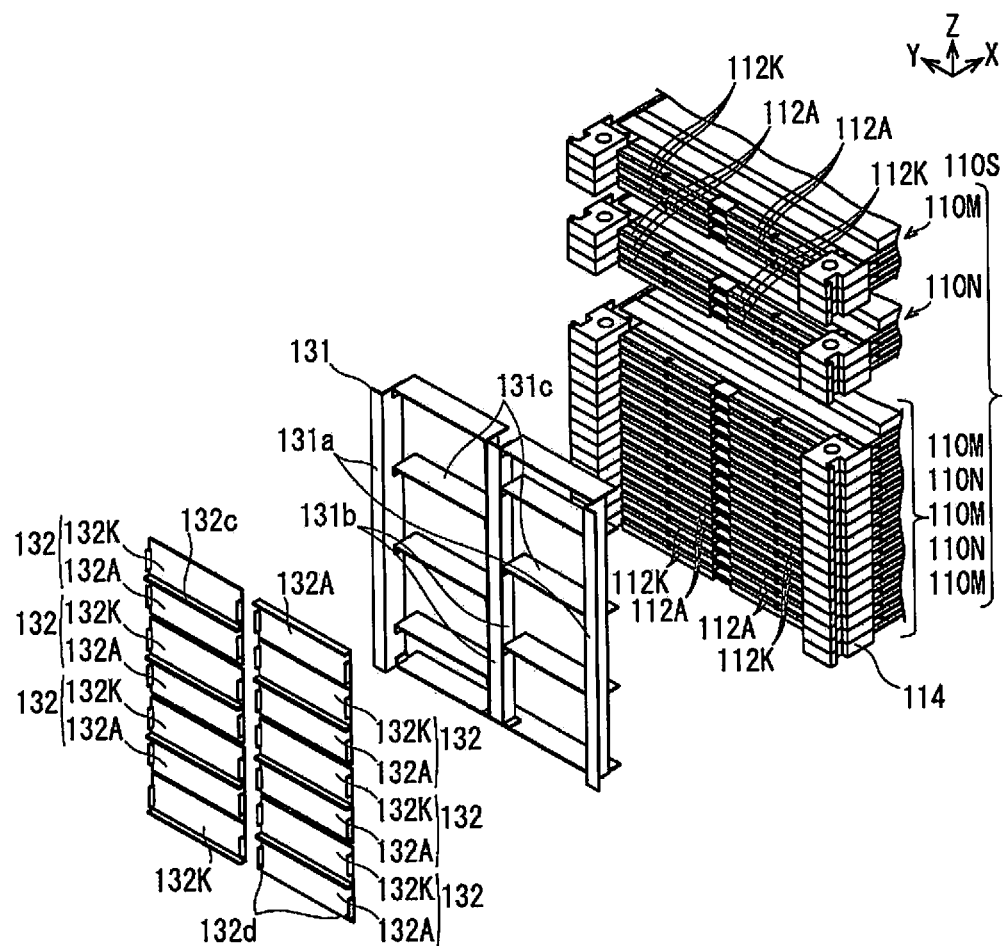
FIG. 4 is a perspective view illustrating a state in which a bus bar holder and the bus bars are removed from the stacked body illustrated in FIG. 2.
Figure 5:
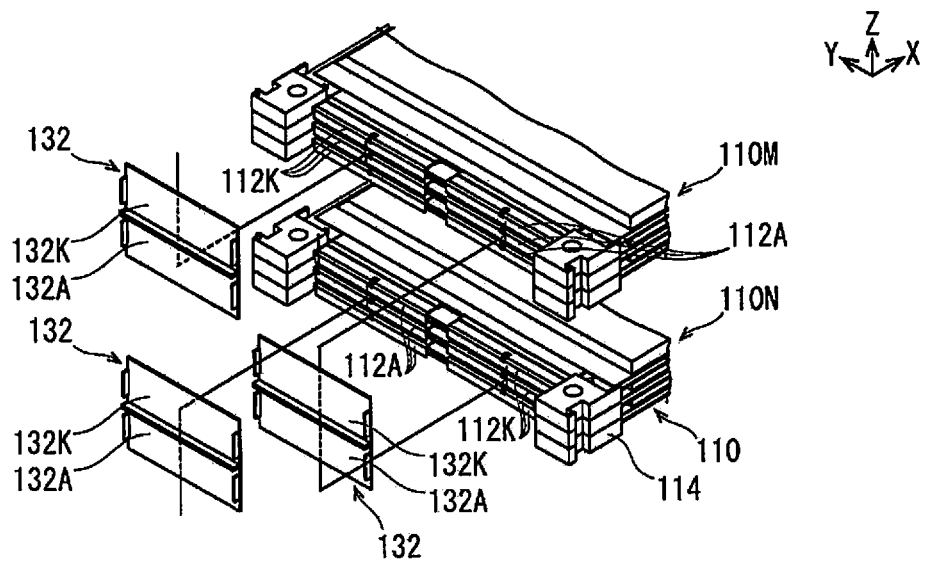
FIG. 5 is a perspective view illustrating a state in which a first cell sub-assembly and a second cell sub-assembly shown in FIG. 4 are electrically connected by means of bus bars.
Figure 6:
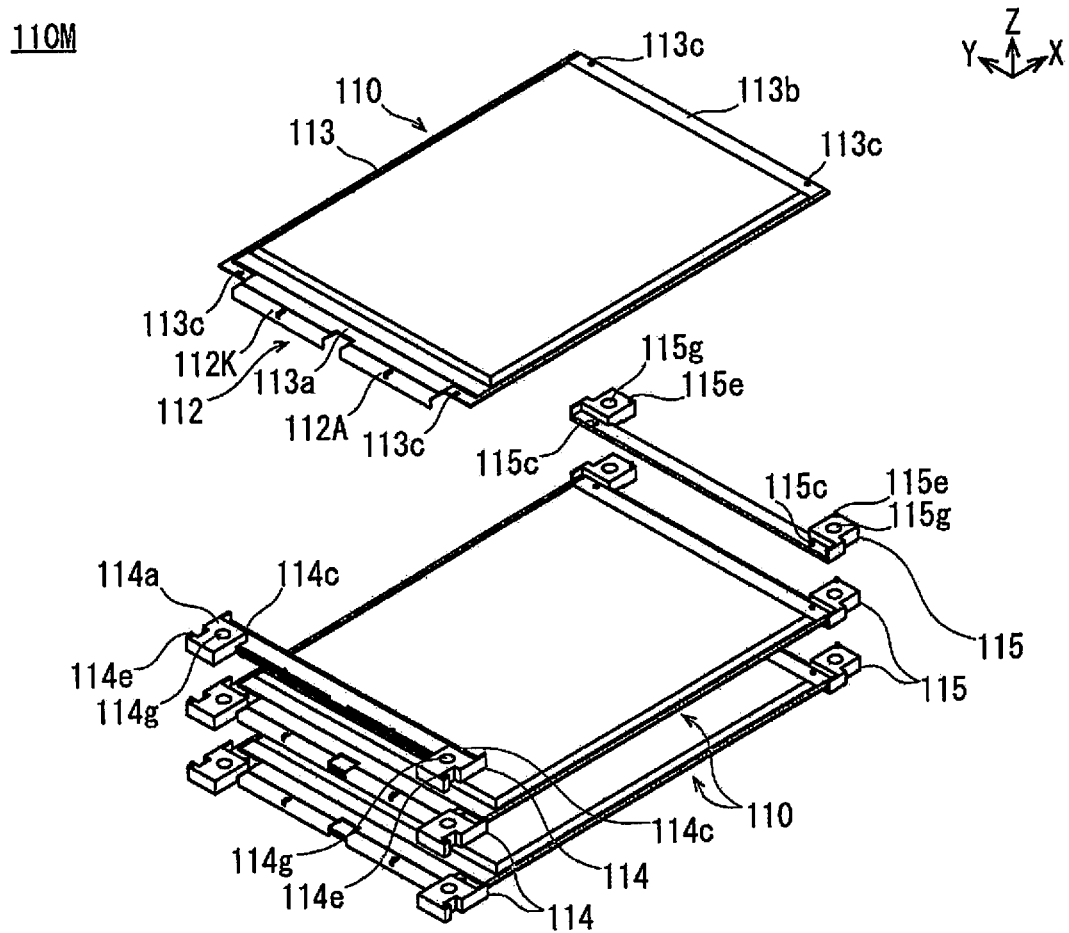
FIG. 6 is a perspective view illustrating a state in which the first cell sub-assembly (three sets of unit cells that are connected in parallel) shown in FIG. 4 is disassembled for each unit cell, and a first spacer and a second spacer are removed from one (the uppermost) unit cell thereof.
Figure 7:
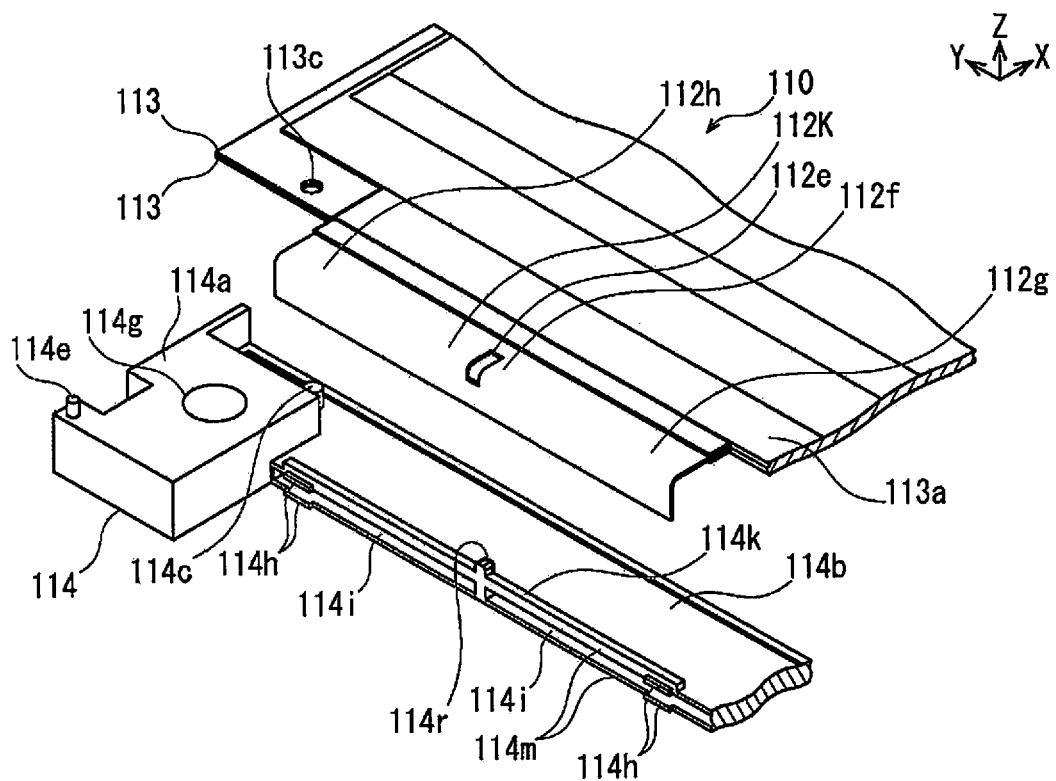
FIG. 7 is a perspective view illustrating a portion of the unit cell and a portion of the first spacer.
Figure 8:
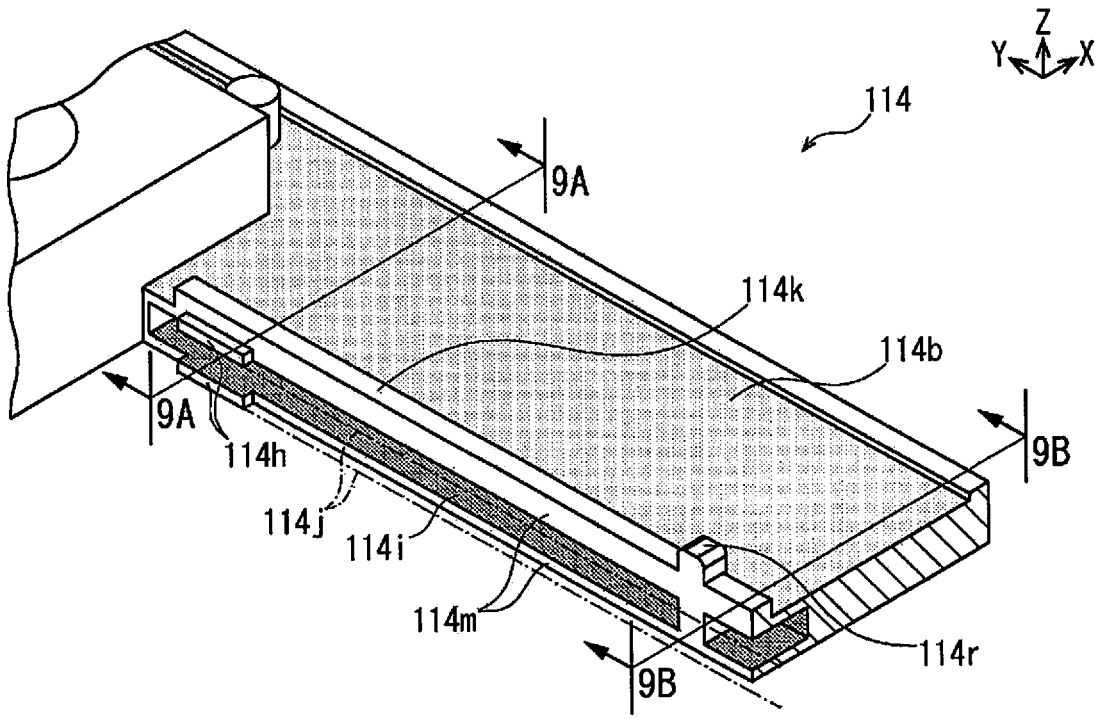
FIG. 8 is a perspective view illustrating a portion of the first spacer.
Figure 9A:
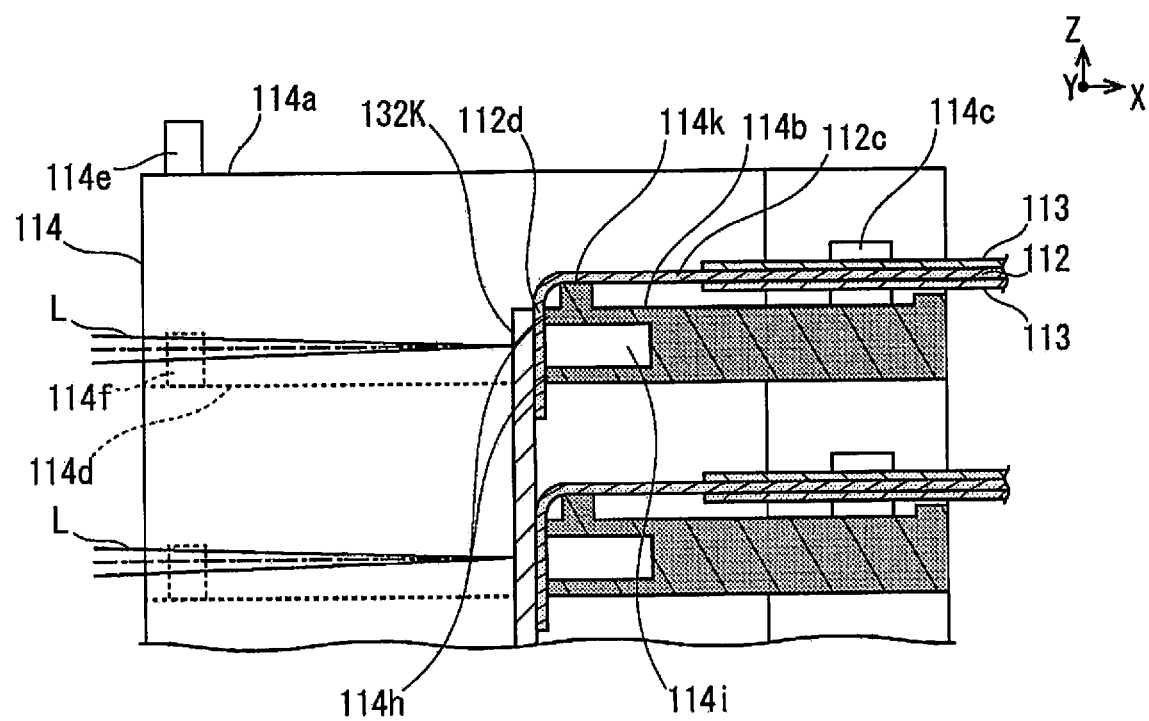
FIG. 9A is a schematic view illustrating one state in which the bus bar abuts the distal end portion of the unit cell disposed in the first spacer, and the distal end portion of the unit cell and the bus bar are laser-welded.
Figure 9B:
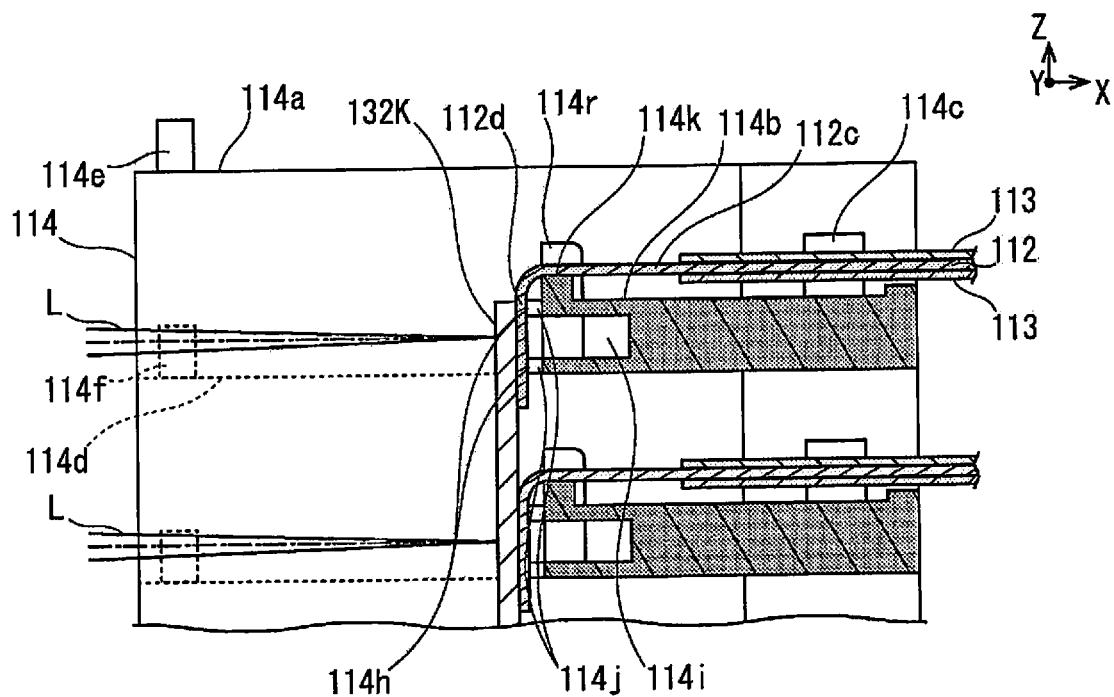
FIG. 9B is a schematic view illustrating another state in which the bus bar abuts the distal end portion of the unit cell disposed in the first spacer, and the distal end portion of the unit cell and the bus bar are laser-welded.

FIG. 1 is a perspective view illustrating the battery pack 100 according to an embodiment. FIG. 2 is a perspective view illustrating a state in which a portion of a bus bar unit 130 (a protective cover 135, an anode side terminal 133, and a cathode side terminal 134) as well as a pressurizing unit 120 (an upper pressure plate 121, a lower pressure plate 122, and left and right side plates 123) are removed from the battery pack 100 shown in FIG. 1. FIG. 3A is a perspective view illustrating a cross section of a main part of a state in which a bus bar 132 is joined to electrode tabs 112 of stacked unit cells 110. FIG. 3B is an end surface view illustrating FIG. 3A from the side. FIG. 4 is a perspective view illustrating a state in which a bus bar holder 131 and the bus bars 132 are removed from a stacked body 110S illustrated in FIG. 2. FIG. 5 is a perspective view illustrating a state in which a first cell sub-assembly 110M and a second cell sub-assembly 110N shown in FIG. 4 are electrically connected by means of the bus bars 132. FIG. 6 is a perspective view illustrating a state in which the first cell sub-assembly 110M (three sets of unit cells 110 that are connected in parallel) shown in FIG. 4 is disassembled for each unit cell 110, and a first spacer 114 and a second spacer 115 are removed from one (the uppermost) unit cell 110 thereof. FIG. 7 is a perspective view illustrating a portion of the unit cell 110 and a portion of the first spacer 114. FIG. 8 is a perspective view illustrating a portion of the first spacer 114. FIG. 9A is a schematic view illustrating one state in which the bus bar 132 abuts a distal end portion 112d of the unit cell 110 disposed in the first spacer 114, and the distal end portion 112d of the unit cell 110 and the bus bar 132 are laser-welded. FIG. 9B is a schematic view illustrating another state in which the bus bar 132 abuts the distal end portion 112d of the unit cell 110 disposed in the first spacer 114, and the distal end portion 112d of the unit cell 110 and the bus bar 132 are laser-welded.

With reference to FIGS. 8 and 9A, in general, the spacer (first spacer 114) according to an embodiment is used in the battery pack 100 including unit cells 110 stacked on each other and electrically connected by a bus bar 132 along a stacking direction (Z direction) of the unit cells 110, with each of the unit cells 110 having a cell body 110H, including a power-generating element 111 that is formed in a flat shape, and an electrode tab 112 that extends out from the cell body 110H with a distal end portion 112d bent along the thickness direction of the cell body 110H; and is provided between each of the unit cells 110. The first spacer 114 has an abutting portion 114h, a recessed portion 114i, and a communicating portion 114j. The abutting portion 114h abuts the distal end portion 112d of the electrode tab 112 along the stacking direction of the unit cells 110. The recessed portion 114i is recessed in a direction intersecting the stacking direction of the unit cells 110 so as to be separated from the distal end portion 112d of the electrode tab 112. The communicating portion 114j allows an inner side of the recessed portion 114i to communicate with the outside of the recessed portion 114i.

With reference to FIGS. 8 and 9A, in general, the battery pack 100 according to the embodiment comprises the plurality of unit cells 110 stacked one atop another, the plurality of spacers (first spacers 114), and the bus bar 132. The unit cell 110 comprises the cell body 110H, which includes the power-generating element 111 formed in a flat shape, and the electrode tab 112 that extends out from the cell body 110H with distal end portions 112d bent along the thickness direction of the cell body 110H. The first spacer 114 comprises the abutting portion 114h that abuts against the distal end portion 112d of the electrode tab 112 along the stacking direction (Z direction) of the unit cells 110, the recessed portion 114i that is recessed in a direction intersecting the stacking direction of the unit cells 110 so as to be separated from the distal end portion 112d of the electrode tab 112, and the communicating portion 114j that allows the inner side of the recessed portion 114i to communicate with the outside of the recessed portion 114i. The bus bar 132 electrically interconnects the distal end portions 112d of the electrode tabs 112 of the various unit cells 110.

With reference to FIGS. 8, 9A, and 9B, in general, a method for manufacturing the battery pack 100 according to the embodiment comprises arranging the spacer (first spacer 114) described above between each of the unit cells 110, each of which has the cell body 110H, which includes the power-generating element 111 and is formed in a flat shape, and the electrode tab 112, which extends out from the cell body 110H and whose distal end portion 112d is bent along the thickness direction of the cell body 110H. Furthermore, the bus bar 132 that electrically interconnects the distal end portions 112d of the electrode tabs 112 of the various unit cells 110 is brought into contact with the distal end portion 112d of each of the electrode tabs 112. Furthermore, laser light L for welding is irradiated on the bus bar 132 so as to correspond to the position of the recessed portion 114i of the first spacer 114 in order to weld the bus bar 132 and the distal end portion 112d of the unit cell 110.

A plurality of the battery packs 100 are mounted in a vehicle such as an electric vehicle and can be charged with electric power from an outdoor charging station or the like, and are used as a power source for driving a vehicle motor. The battery pack 100 is configured by electrically connecting a stacked body 110S, obtained by stacking a plurality of the unit cells 110 by means of a bus bar unit 130, in a state of pressurization by means of a pressurizing unit 120. Each configuration of the battery pack 100, including the spacer (first spacer 114), will be described below.

The configuration of the stacked body 110S will be described in detail.

As shown in FIG. 4, the stacked body 110S is configured by alternately connecting in series a first cell sub-assembly 110M composed of three of the unit cells 110 that are electrically connected in parallel, and a second cell sub-assembly 110N composed of three of the unit cells 110 that are electrically connected in parallel.

As shown in FIG. 4, the first cell sub-assembly 110M corresponds to the three unit cells 110 that are positioned in the first row (lowermost row), the third row, the fifth row, and the seventh row (uppermost row) of the battery pack 100. As shown in FIG. 4, the second cell sub-assembly 110N corresponds to the three unit cells 110 that are positioned in the second row, the fourth row, and the sixth row of the battery pack 100.

The first cell sub-assembly 110M and the second cell sub-assembly 110N are similarly configured. However, the first cell sub-assembly 110M and the second cell sub-assembly 110N are arranged such that three anode side electrode tabs 112A and three cathode side electrode tabs 112K are alternately positioned along the Z direction by interchanging the tops and bottoms of the three unit cells 110, as shown in FIGS. 4 and 5.

As shown in FIGS. 4 and 5, in the first cell sub-assembly 110M, all of the anode side electrode tabs 112A are positioned on the right side of the drawing, and all of the cathode side electrode tabs 112K are positioned on the left side of the drawing.

As shown in FIGS. 4 and 5, in the second cell sub-assembly 110N, all of the anode-side electrode tabs 112A are positioned on the left side of the drawing, and all of the cathode-side electrode tabs 112K are positioned on the right side of the drawing. If the tops and bottoms are simply interchanged every three of the unit cells 110, the orientations of the distal end portions 112d of the electrode tabs 112 will vary vertically in the Z direction. Therefore, each of the distal end portions 112d is bent downwards, so that the orientations of all of the distal end portions 112d of the electrode tabs 112 of the unit cells 110 are aligned.

The unit cell 110 corresponds to a lithium-ion secondary battery, for example. A plurality of the unit cells 110 are connected in series in order to satisfy the drive voltage specification of the vehicle motor. A plurality of the unit cells 110 are connected in parallel in order to ensure the battery capacity and to extend the travel distance of the vehicle.

As shown in FIGS. 3A and 3B, the unit cell 110 includes the cell body 110H, which includes the power-generating element 111 that carries out charging and discharging and is formed into a flat shape, the electrode tab 112 that extends out from the cell body 110H and whose distal end portion 112d is bent along the thickness direction of the cell body 110H, and a laminate film 113 for sealing the power-generating element 111.

The power-generating element 111 is formed by stacking a plurality of sets of anodes and cathodes that are separated by separators, and functions as a chargeable and dischargeable electrical storage body via the electrode tab 112.

As shown in FIGS. 3A, 3B, and 4, the electrode tab 112 is for exposing the power-generating element 111 to the outside. The electrode tab 112 is composed of the anode side electrode tab 112A and the cathode side electrode tab 112K.

The proximal end side of the anode side electrode tab 112A is joined to all of the anodes included in one of the power-generating element 111. The anode side electrode tab 112A has the form of a thin plate and is made of aluminum in accordance with the characteristics of the anode. The proximal end side of the cathode side electrode tab 112K is joined to all of the cathodes included in one of the power-generating elements 111. The cathode side electrode tab 112K has the form of a thin plate and is made of copper in accordance with the characteristics of the cathode.

As shown in FIGS. 3B and 7, the electrode tab 112 has the form of an L. A proximal end portion 112c of the electrode tab 112 is supported from below by a support portion 114k of the first spacer 114. The distal end portion 112d of the electrode tab 112 is bent downward in the Z direction and faces the abutting portion 114h of the first spacer 114.

As shown in FIG. 7, the electrode tab 112 has a hole 112e in a central portion 112f along the width direction (Y direction). The hole 112e is formed in an elongated shape from the proximal end portion 112c to the distal end portion 112d of the electrode tab 112. The boss 114r of the first spacer 114 is inserted into the hole 112e of the electrode tab 112.

As shown in FIGS. 3A and 3B, the laminate film 113 is configured in pairs and is for sandwiching and sealing the cell body 110H from above and below along the Z direction. In the pair of laminate films 113, the anode side electrode tab 112A and the cathode side electrode tab 112K extend out to the outside from gaps between one end portions 113a thereof along the Y direction. The laminate film 113 includes a sheet-like metal layer and a sheet-like insulating layer that covers and insulates the metal layer from both sides.

The unit cells 110 are stacked, as shown in FIGS. 3(A), 3(B), and 4, in a state of support by means of a pair of spacers (first spacer 114 and second spacer 115), as shown in FIG. 6.

The pair of spacers (first spacer 114 and second spacer 115) are used to arrange the unit cells 110 at constant intervals along the Z direction, as shown in FIGS. 2, 3A, and 3B. The first spacer 114 supports the side of the unit cell 110 provided with the electrode tab 112. The second spacer 115 supports the unit cell 110 on the side not provided with the electrode tab 112, so as to oppose the first spacer 114 in the X direction of the unit cell 110.

As shown in FIGS. 7 and 8, the first spacer 114 is made from reinforced plastic having an insulating property. The first spacer 114 comprises the abutting portion 114h that abuts the distal end portion 112d of the electrode tab 112 along the stacking direction of the unit cells 110, the recessed portion 114i that is recessed in a direction intersecting the stacking direction of the unit cells 110 so as to be separated from the distal end portion 112d of the electrode tab 112, and the communicating portion 114j that allows the inner side of the recessed portion 114i to communicate with the outside of the recessed portion 114i. Furthermore, as shown in FIGS. 7 and 8, the first spacer 114 has the support portion 114k that is adjacent to the recessed portion 114i and that supports the electrode tab 112 from below in the Z direction along the directions (X direction and Y direction) intersecting the stacking direction (Z direction) of the unit cells 110.

As shown in FIG. 7, the abutting portion 114h of the first spacer 114 abut both end portions (one end portion 112g and other end portion 112h) of the distal end portion 112d of the electrode tab 112 along the width direction (Y direction). The abutting portion 114h has a side surface 114m along the Y direction and the Z direction of the first spacer 114. The abutting portion 114h supports (from the back) the one end portion 112g and the other end portion 112h of the electrode tab 112 along the X direction. That is, as shown in FIG. 3B, the abutting portion 114h abuts the distal end portion 112d of the electrode tab 112 and positions the distal end portion 112d of the electrode tab 112 along the X direction.

As shown in FIG. 9A, the abutting portion 114h of the first spacer 114 abuts the distal end portion 112d of the electrode tab 112 of the unit cell 110. On the other hand, as shown in FIG. 9B, there is a gap corresponding to the communicating portion 114j between the side surface 114m of the first spacer 114 and the electrode tab 112 of the unit cell 110 in a region without the abutting portion 114h.

As shown in FIGS. 7-9B, the recessed portion 114i of the first spacer 114 is provided in a region extending from a position of the abutting portion 114h to a position corresponding to the welded portion between the distal end portion 112d of the electrode tab 112 and the bus bar 132 along the width direction (Y direction) of the electrode tab 112. The recessed portion 114i is provided on the side surface 114m of the first spacer 114 so as to vertically divide the two abutting portions 114h along the horizontal direction (Y direction).

As shown in FIGS. 7-9B, the communicating portion 114j of the first spacer 114 is formed by notching a portion adjacent to the abutting portion 114h so as to be separated from the distal end portion 112d of the electrode tab 112. The communicating portion 114j corresponds to an elongated gap positioned between each of the abutting portions 114h.

As shown in FIGS. 7 and 8, the support portion 114k of the first spacer 114 is provided in an elongated shape along the width direction (Y direction) of the electrode tab 112. The support portion 114k is provided on a flat supporting surface 114b that is provided on the upper surface of the first spacer 114 along the Y direction. That is, the support portion 114k is formed on the supporting surface 114b along a linear outer edge facing the abutting portion 114h, projecting upward from the supporting surface 114b in a rectangular shape.

Here, the first spacer 114 largely suppresses the contact area with the electrode tab 112 at the side surface 114m formed by the Z direction and the Y direction by means of the recessed portion 114i and the communicating portion 114j.

As shown in FIGS. 7-9A, the first spacer 114 has a convex boss 114r projecting from the support portion 114k. The boss 114r also projects into the recessed portion 114i positioned below the support portion 114k in the Z direction. The boss 114r is inserted into the hole 112e that is opened in the central portion 112f of the electrode tab 112 in order to regulate the position of the electrode tab 112. The boss 114r is swaged and fixed to a peripheral portion of the hole 112e of the electrode tab 112. The swaging of the boss 114r is carried out by heating and pressing the boss 114r to deform the boss into a hemispherical shape.

As shown in FIGS. 6 and 7, the first spacer 114 has a pair of connecting pins 114c that respectively project upward at both ends of the supporting surface 114b along the Y direction. The pair of connecting pins 114c are cylindrical in form and are inserted into connecting holes 113c formed at both ends of the one end portion 113a of the laminate film 113 along the Y direction, thereby positioning the unit cell 110.

In a plurality of the first spacers 114, an upper surface 114a of one first spacer 114 and a lower surface 114d of another first spacer 114 are in contact, as shown in FIG. 3B. The plurality of first spacers 114 are positioned relative to each other by fitting a cylindrical positioning pin 114e that projects from the upper surface 114a of one first spacer 114 into a positioning hole 114f that opens onto the lower surface 114d of another first spacer 114, as also shown in FIG. 3B.

As shown in FIG. 6, the first spacer 114 is provided with locating holes 114g at both ends along the Y direction. Bolts for connecting and positioning a plurality of the battery packs 100 with respect to each other along the Z direction are inserted in the locating holes 114g.

Since it is not necessary for the second spacer to support the electrode tab 112, the second spacer 115 is configured by simplifying the first spacer 114. As shown in FIG. 6, similarly to the first spacer 114, the second spacer 115 includes positioning pins 115e for positioning the second spacers relative to each other, connecting pins 115c for positioning the unit cell 110, and locating holes 115g, into which bolts for interconnecting and positioning a plurality of the battery packs 100 relative to each other are inserted.

The configuration of the pressurizing unit 120 will be described in detail.

The pressurizing unit 120 includes the upper pressure plate 121 and the lower pressure plate 122, which pressurize the power-generating element 111 of each of the unit cells 110 of the unit cells 110 of the stacked body 110S from above and below, and a pair of side plates 123 that fix the upper pressure plate 121 and the lower pressure plate 122 in a state of pressurization of the stacked body 110S.

As shown in FIGS. 1 and 2, the upper pressure plate 121, together with the lower pressure plate 122, hold and sandwich the plurality of the unit cells 110 that constitute the stacked body 110S from above and below and pressurize the power-generating element 111 of each of the unit cells 110. The upper pressure plate 121 has the form of a plate with recesses and protrusions and is made from a metal possessing sufficient rigidity. The upper pressure plate 121 is provided on a horizontal plane. The upper pressure plate 121 has a pressurizing surface 121a that pressurizes the power-generating element 111 downwards, as illustrated in FIG. 2. The pressurizing surface 121a is formed flat, protruding downward from a central portion of the upper pressure plate 121. The upper pressure plate 121 has locating holes 121b into which bolts for interconnecting the battery packs 100 are inserted. The locating holes 121b are through-holes and formed at the four corners of the upper pressure plate 121.

As shown in FIG. 2, the lower pressure plate 122 has the same shape as the upper pressure plate 121 and is provided so that the top and bottom of the upper pressure plate 121 is reverse. Like the upper pressure plate 121, the lower pressure plate 122 includes a pressurizing surface 122a that pressurizes the power-generating element 111 upwards, and locating holes 122b, into which bolts for connecting and positioning the battery packs 100 relative to each other along the Z direction are inserted.

As shown in FIGS. 1 and 2, the pair of side plates 123 are for fixing the upper pressure plate 121 and the lower pressure plate 122 in a state of pressurization of the stacked body 110S. That is, the pair of side plates 123 hold the interval between the upper pressure plate 121 and the lower pressure plate 122 constant. In addition, the pair of side plates 123 cover and protect the side surfaces of the stacked unit cells 110 along the X direction. The side plate 123 has the form of a flat plate and is made of metal. The pair of side plates 123 stand upright so as to face both side surfaces of the stacked unit cells 110 along the X direction. The pair of side plates 123 are welded to the upper pressure plate 121 and the lower pressure plate 122.

The configuration of the bus bar unit 130 will be described in detail.

The bus bar unit 130 includes the bus bar holder 131 that integrally holds a plurality of the bus bars 132, the bus bars 132 that electrically interconnect the distal end portions 112*d* of the electrode tabs 112 of the different unit cells 110 (vertically adjacent unit cells 110), an anode side terminal 133 that causes the anode side terminal ends of the plurality of the electrically connected unit cells 110 to oppose an external input/output terminal, a cathode side terminal 134 that causes the cathode side terminal ends of the plurality of the electrically connected unit cells 110 to oppose an external input/output terminal, and a protective cover 135 for protecting the bus bars 132, and the like.

As shown in FIGS. 2 and 4, the bus bar holder 131 is for integrally holding a plurality of the bus bars 132. The bus bar holder 131 integrally holds the plurality of the bus bars 132 in a matrix so as to oppose the electrode tab 112 of each of the unit cells 110 of the stacked body 110S. The bus bar holder 131 is made of resin having insulating properties and has the form of a frame.

As shown in FIG. 4, the bus bar holder 131 is respectively provided with a pair of columnar support portions 131*a* that stand upright along the Z direction, so as to be positioned on both sides of the longitudinal direction of the first spacers 114 that support the electrode tabs 112 of the unit cells 110. The pair of columnar support portions 131*a* are fitted to the side surfaces of the first spacers 114. The pair of columnar support portions 131*a* have the form of an L when viewed along the Z direction and have the form of a plate that extends in the Z direction. The bus bar holder 131 is provided with an auxiliary columnar support portion 131*b* to stand upright along the Z direction so as to be positioned in the vicinity of the center of the first spacer 114 in the longitudinal direction. The auxiliary columnar support portion 131*b* has the form of a U in a cross section along the XY plane extending in the Z direction.

As shown in FIG. 4, the bus bar holder 131 includes insulating portions 131*c* that respectively protrude between adjacent bus bars 132 in the Z direction. The insulating portions 131*c* have the form of a plate that extends in the Y direction. Each of the insulating portions 131*c* is provided horizontally between the columnar support portion 131*a* and the auxiliary columnar support portion 131*b*. The insulating portion 131*c* prevents discharge by insulating the space between bus bars 132 that are adjacent to each other along the Z direction.

The bus bar holder 131 may be configured by joining together the columnar support portions 131*a*, the auxiliary columnar support portions 131*b*, and the insulating portions 131*c*, which are independently formed, or may be configured by integrally molding the columnar support portions 131*a*, the auxiliary columnar support portions 131*b*, and the insulating portions 131*c*.

As shown in FIGS. 3A, 3B, 4 and 5, the bus bars 132 are for electrically interconnecting the electrode tabs 112 of the vertically adjacent unit cells 110. The bus bars 132 electrically connect the anode side electrode tab 112A of one unit cell 110 and the cathode side electrode tab 112K of another unit cell 110. For example, the bus bars 132 connect three vertically arranged anode side electrode tabs 112A of the first cell sub-assembly 110M and three vertically arranged cathode side electrode tabs 112K of the second cell sub-assembly 110N, as illustrated in FIG. 5.

That is, for example, the bus bars 132 connect the three anode side electrode tabs 112A of the first cell sub-assembly 110M in parallel and connect the three cathode side electrode tabs 112K of the second cell sub-assembly 110N in parallel, as shown in FIG. 5. Moreover, the bus bars 132 connect the three anode side electrode tabs 112A of the first cell sub-assembly 110M and the three cathode side electrode tabs 112K of the second cell sub-assembly 110N in series. The bus bars 132 are laser-welded to the anode side electrode tab 112A of one unit cell 110 and the cathode side electrode tab 112K of another unit cell 110.

As shown in FIGS. 3A and 4, the bus bar 132 is formed by joining the anode side bus bar 132A and the cathode side bus bar 132K. The anode side bus bar 132A and the cathode side bus bar 132K have the same shape, each having the form of an L. The bus bar 132 is integrally formed by a joint portion 132*c*, which is formed by joining one bent end of the anode side bus bar 132A to one bent end of the cathode side bus bar 132K, as illustrated in FIGS. 3A and 4. The anode side bus bar 132A and the cathode side bus bar 132K, which constitute the bus bar 132, are provided with side portions 132*d* that are joined to the bus bar holder 131 at both ends in the Y direction, as illustrated in FIG. 4.

The anode side bus bar 132A is made of aluminum in the same manner as the anode side electrode tab 112A of the unit cell 110. The cathode side bus bar 132K is made of copper, in the same manner as the cathode side electrode tab 112K of the unit cell 110. The anode side bus bar 132A and the cathode side bus bar 132K, which are made from different metals, are joined to each other by means of ultrasonic bonding to form the joint portion 132*c*.

Of the bus bars 132 arranged in the form of a matrix, the bus bar 132 positioned on the upper right in the drawing in FIG. 4 corresponds to the anode side terminal ends of 21 unit cells 110 (3 parallel 7 series) and is composed of only the anode side bus bar 132A. This anode side bus bar 132A is laser-welded to the anode side electrode tabs 112A of the three uppermost unit cells 110 of the stacked unit cells 110.

Of the bus bars 132 arranged in the form of a matrix, the bus bar 132 positioned on the lower left in the drawing in FIG. 4 corresponds to the cathode side terminal ends of 21 unit cells 110 (3 parallel 7 series) and is composed of only the cathode side bus bar 132K. The cathode side bus bar 132K is laser-welded to the cathode side electrode tabs 112K of the three lowermost unit cells 110 of the stacked unit cells 110.

As shown in FIGS. 1 and 2, the anode side terminal 133 causes the anode side terminal ends of the plurality of the electrically connected unit cells 110 to oppose an external input/output terminal. The anode side terminal 133 is joined to the anode side bus bar 132A positioned on the upper right in the drawing, from among the bus bars 132 arranged in a matrix, as illustrated in FIG. 2. The anode side terminal 133 has the form of a plate, both ends of which are bent, and is made from a conductive metal.

As shown in FIGS. 1 and 2, the cathode side terminal 134 causes the cathode side terminal ends of the plurality of the electrically connected unit cells 110 to oppose an external input/output terminal. The cathode side terminal 134 is joined to the cathode side bus bar 132K positioned on the lower left in the drawing, from among the bus bars 132 arranged in a matrix, as illustrated in FIG. 2. The cathode side terminal 134 has the shape of the anode side terminal 133, with the top and bottom inverted.

As shown in FIGS. 1 and 2, the protective cover 135 is for protecting the bus bars 132 and the like. That is, the protective cover 135 integrally covers the plurality of the bus bars 132 to thereby prevent each of the bus bars 132 from coming into contact with other members, etc., to cause electrical short-circuiting. The protective cover 135 is made from a plastic having an insulating property, where one end 135b and the other end 135c of a side surface 135a standing upright along the Z direction are bent claw-like in the X direction, as illustrated in FIG. 2.

The protective cover 135 covers each of the bus bars 132 with the side surface 135a, while sandwiching and fixing the bus bar holder 131 from above and below with the one end 135b and the other end 135c. The protective cover 135 has a first opening 135d, which is a rectangular hole for exposing the anode side terminal 133 to the outside, and a second opening 135e, which is a rectangular hole for exposing the cathode side terminal 134 to the outside on the side surface 135a.

In regard to the method of manufacturing the battery pack 100, a method for welding the bus bar 132 and the electrode tab 112 of the unit cell 110 will now be described with reference to FIGS. 9A and 9B.

The first spacer 114 is disposed between each of the unit cells 110. Next, the bus bar 132 is brought into contact with the distal end portion 112d of each of the electrode tabs 112. As shown in FIG. 9A, the abutting portion 114h of the first spacer 114 supports (from the back) the bus bar 132 and the distal end portion 112d of the electrode tab 112. Next, as shown in FIGS. 9A and 9B, in order to weld the bus bar 132 and the distal end portion 112d of the unit cell 110, laser light L for welding is irradiated on the bus bar 132 so as to correspond to the position of the recessed portion 114i of the first spacer 114. Here, as shown in FIG. 9B, gas, generated from the interior of the recessed portion 114i of the first spacer 114 due to heat from the bus bar 132 irradiated with the laser light L, is discharged to the outside of the recessed portion 114i via the communicating portion 114j (gap between the electrode tab 112 of the unit cell 110 and the side surface 114m of the first spacer 114).

The action and effects of the above-described first embodiment will be described.

The first spacer 114 has an insulating property, is used in the battery pack 100, obtained by electrically interconnecting the unit cells 110, which are stacked one atop another, by means of the bus bar 132 along the stacking direction of the unit cells 110, each of which has the cell body 110H, which includes the power-generating element 111 and is formed in a flat shape, and the electrode tab 112, which extends out from the cell body 110H and whose distal end portion 112d is bent along the thickness direction of the cell body 110H; and is provided between each of the unit cells 110. The first spacer 114 has the abutting portion 114h, the recessed portion 114i, and the communicating portion 114j. The abutting portion 114h abuts the distal end portion 112d of the electrode tab 112 along the stacking direction of the unit cells 110. The recessed portion 114i is recessed in a direction intersecting the stacking direction of the unit cells 110 so as to be separated from the distal end portion 112d of the electrode tab 112. The communicating portion 114j allows an inner side of the recessed portion 114i to communicate with the outside of the recessed portion 114i.

The battery pack 100 comprises a plurality of the unit cell 110 stacked one atop another, a plurality of the first spacers 114, and the bus bar 132. The unit cell 110 comprises the cell body 110H, which includes the power-generating element 111 formed in a flat shape, and the electrode tab 112 that extends out from the cell body 110H with a distal end portion 112d bent along the thickness direction of the cell body 110H. The first spacer 114 comprises the abutting portion 114h that abuts the distal end portion 112d of the electrode tab 112 along the stacking direction of the unit cells 110, the recessed portion 114i that is recessed in a direction intersecting the stacking direction of the unit cells 110 so as to be separated from the distal end portion 112d of the electrode tab 112, and the communicating portion 114j that allows the inner side of the recessed portion 114i to communicate with the outside of the recessed portion 114i. The bus bar 132 electrically interconnects the distal end portions 112d of the electrode tabs 112 of the different unit cells 110.

The method for manufacturing the battery pack 100 comprises arranging the first spacer 114 described above between each of the unit cells 110, each of which has the cell body 110H, which includes the power-generating element 111 formed in a flat shape, and the electrode tab 112 that extends out from the cell body 110H with a distal end portion 112d bent along the thickness direction of the cell body 110H. Furthermore, the bus bar 132 that electrically interconnects the distal end portions 112d of the electrode tabs 112 of the different unit cells 110 is brought into contact with the distal end portion 112d of each of the electrode tabs 112. Furthermore, in order to weld the bus bar 132 and the distal end portion 112d of the unit cell 110, laser light L for welding is irradiated on the bus bar 132 so as to correspond to the position of the recessed portion 114i of the first spacer 114.

By means of the first spacer 114, the battery pack 100, and the method of manufacturing the battery pack 100, when the laser light L for welding is irradiated on the bus bar 132 so as to correspond to the position of the recessed portion 114i of the first spacer 114, the abutting portion 114h of the first spacer 114 is heated via the electrode tab 112 of the unit cell 110 and the bus bar 132. By coming into contact with the distal end portion 112d of the electrode tab 112 from the opposite side of the irradiation direction of the laser light L, the abutting portion 114h of the first spacer 114 supports (from the back) the bus bar 132 and the distal end portion 112d of the electrode tab 112 such that the bus bar 132 and the distal end portion 112d of the electrode tab 112 come into close contact with each other, facilitating welding. Here, the gas, generated from the interior of the recessed portion 114i due to the heating of the first spacer 114, is discharged to the outside of the recessed portion 114i via the communicating portion 114j. The gas is formed due to the vaporization from heating of the first spacer 114, and if the gas were to enter the welded portion between the bus bar 132 and the electrode tabs 112 of the unit cell 110, the mechanical strength of the welded portion would be reduced and the electrical resistance would increase. Thus, by means of the first spacer 114, the battery pack 100, and the method of manufacturing the battery pack 100, it is possible to prevent a reduction of the mechanical strength at the welded portion between the bus bar 132 and the electrode tab 112 of the unit cell 110 as well as to prevent an increase in the electrical resistance.

The abutting portion 114h of the first spacer 114 preferably abuts both end portions (one end portion 112g and other end portion 112h) of the distal end portion 112d of the electrode tab 112 along the width direction (Y direction).

By means of the first spacer 114, it is possible to support (from the back) both end portions (one end portion 112g and the other end portion 112h) of the distal end portion 112d of the electrode tab 112 with the abutting portion 114h of the first spacer 114. Thus, by means of the first spacer 114, it is possible to prevent a reduction of the mechanical strength at the welded portion as well as to prevent an increase in the electrical resistance, while providing sufficient weld strength between of the bus bar 132 and the electrode tab 112 of the unit cell 110.

In addition, by means of the first spacer 114, by bringing the two end portions (left and right) of the electrode tab 112 into contact with the first spacer along the width direction (Y direction), compared to a case of bringing the two end portions (above and below) into contact with the first spacer along the direction (Z direction) intersecting the width direction (Y direction) of the electrode tab 112, it is possible to suppress the thickness along the Z direction. Accordingly, by means of the first spacer 114, when the battery pack 100 is configured by stacking a plurality of the first spacers 114 along the Z direction, it is possible to maintain the stacking efficiency thereof.

In addition, by means of the first spacer 114, if the two end portions (one end portion 112g and the other end portion 112h) of the electrode tab 112 adjacent to the bus bar 132 are supported (from the back) by means of the abutting portion 114h of the first spacer 114 while pressing the bus bar 132 toward the side of the first spacer 114, it is possible to cause the peripheral portion separated from the two end portions (one end portion 112g and the other end portion 112h) of the electrode tab 112 to also come into contact with the bus bar 132. In particular, in a case in which the distal end portion 112d of the electrode tab 112 is distorted, it is possible to pressurize the two end portions (one end portion 112g and the other end portion 112h) of the distal end portion 112d of the electrode tab 112 by means of the abutting portion 114h of the first spacer 114 to correct the distortion. Accordingly, by means of the first spacer 114, it is possible to prevent a reduction of the mechanical strength at the welded portion as well as to prevent an increase in the electrical resistance, while providing sufficient weld strength between the bus bar 132 and the electrode tab 112 of the unit cell 110.

The recessed portion 114i of the first spacer 114 is preferably provided in a region extending from the position of the abutting portion 114h to the position corresponding to the welded portion between the distal end portion 112d of the electrode tab 112 and the bus bar 132 along the width direction (Y direction) of the electrode tab 112.

By means of the first spacer 114, since the recessed portion 114i is provided in the region of the abutting portion 114h while the distal end portion 112d of the electrode tab 112 is supported (from the back) by the abutting portion 114h, it is possible to minimize contact with the distal end portion 112d of the electrode tab 112. That is, by means of the recessed portion 114i, it is possible to sufficiently suppress the gas that is generated due to the heating of the abutting portion 114h of the first spacer 114 via the distal end portion 112d of the electrode tab 112. Accordingly, by means of the first spacer 114, it is possible to prevent a reduction of the mechanical strength at the welded portion as well as to prevent an increase in the electrical resistance, while providing sufficient weld strength between the bus bar 132 and the electrode tab 112 of the unit cell 110.

The communicating portion 114j of the first spacer 114 is preferably formed by notching a portion adjacent to the abutting portion 114h so as to be separated from the distal end portion 112d of the electrode tab 112.

By means of the first spacer 114, it is possible to provide the communicating portion 114j with an extremely simple structure. By providing the communicating portion 114j, the first spacer 114 would not increase in size, become troublesome to manufacture, or be subject to increased manufacturing costs.

Modification of First Embodiment

Figure 10:
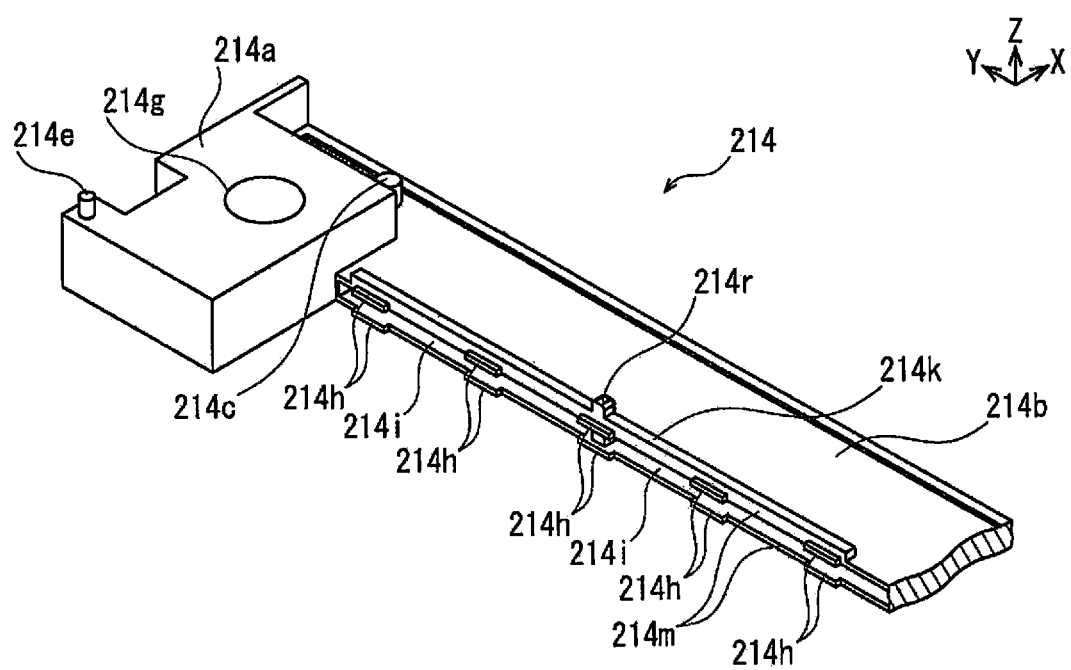
FIG. 10 is a perspective view illustrating a portion of the first spacer of a modified example of the first embodiment.

FIG. 10 is a perspective view illustrating a portion of a first spacer 214 of a modification of the first embodiment.

The first spacer 214 according to the modified example of the first embodiment is different from the first spacer 114 of the first embodiment described above in that the abutting portion 214h thereof also abuts, in addition to the two ends (one end portion 112g and the other end portion 112h) of the electrode tab 112, a central portion 112f separated from the two ends. The abutting portion 114h of the first spacer 114 of the first embodiment described above abuts only the two ends (one end portion 112g and the other end portion 112h) of the electrode tab 112.

As shown in FIG. 10, there are a total of five abutting portions 214h of the first spacer 214 aligned along the Y direction of a side surface 214m at a set interval, one each at positions opposing the one end portion 112g and the other end portion 112h of the electrode tab 112, one at a position opposing the central portion 112f of the electrode tab 112, and one each at an intermediate position between the one end portion 112g and the central portion 112f of the electrode tab and an intermediate position between the other end portion 112h and the central portion 112f of the electrode tab. The plurality of the abutting portions 214h may all be formed in the same shape, or those positioned in the middle or both ends of the side surface 214m may be formed elongated in the Y direction.

The action and effects of the above-described modified example of the first embodiment will be described.

The first spacer 214 abuts, at the abutting portions 214h thereof, portions (such as the central portion 112O separated from the two ends (one end portion 112g and the other end portion 112h) along the width direction (Y direction) of the distal end portion 112d of the electrode tab 112.

By means of the first spacer 214, it is possible to support (from the back) the portions (such as the central portion 112O separated from the two ends of the distal end portion 112d of the electrode tab 112 with the abutting portions 214h. Accordingly, by means of the first spacer 214, it is possible to prevent a reduction of the mechanical strength at the welded portion as well as to prevent an increase in the electrical resistance, while providing sufficient weld strength between the bus bar 132 and the electrode tab 112 of the unit cell 110.

Additionally, by means of the first spacer 214, if the portions (for example, the central portion 112O separated from the two ends of the electrode tab 112 adjacent to the bus bar 132 are supported (from the back) by means of the abutting portion 214h of the first spacer 214 while pressing the bus bar 132 toward the side of the first spacer 214, it is possible to cause the peripheral portion of, for example, the central portion 112f of the electrode tab 112 to also come in contact with the bus bar 132. Such a configuration is effective if the overall length of the first spacer 214 in the width direction (Y direction) of the electrode tab 112 is sufficiently long relative to the overall length in the Z direction. In particular, in a case in which the distal end portion 112d of the electrode tab 112 is distorted, it is possible to pressurize the central portion 112f of the distal end portion 112d of the electrode tab 112 by means of the abutting portion 214h of the first spacer 214 to correct the distortion. Accordingly, by means of the first spacer 214, it is possible to prevent a reduction of the mechanical strength at the welded portion as well as to prevent an increase in the electrical resistance, while providing sufficient weld strength between the bus bar 132 and the electrode tab 112 of the unit cell 110.

Second Embodiment

Figure 11:
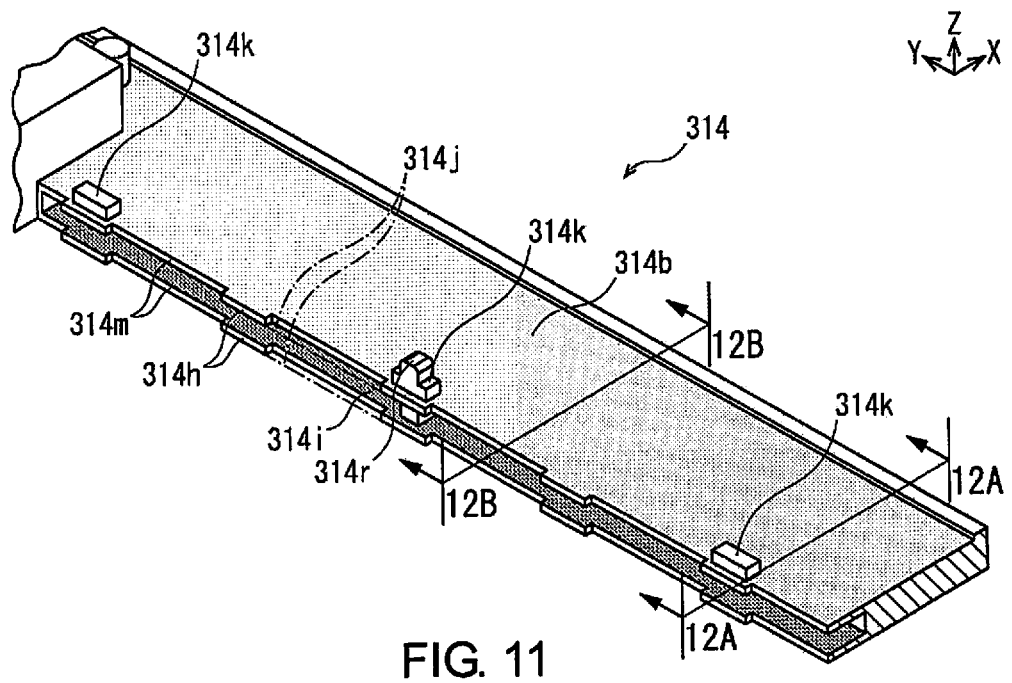
FIG. 11 is a perspective view illustrating a portion (one side along the Y direction) of the first spacer of a second embodiment.
Figure 12A:
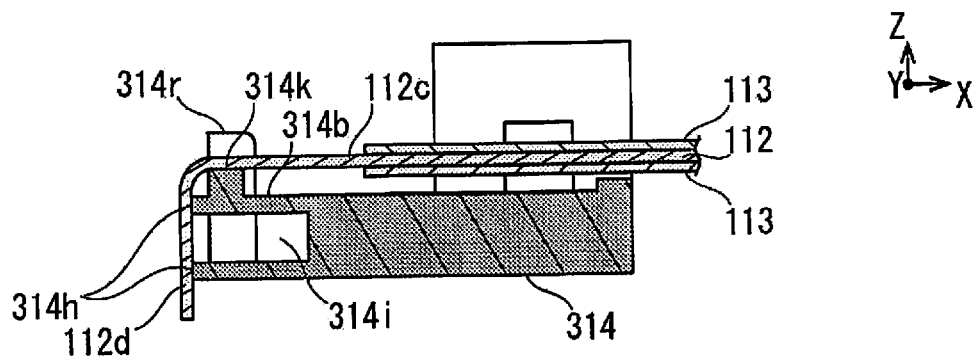
FIG. 12A is a side view illustrating a portion of the unit cell and the first spacer in a cross section along 12A-12A of the first spacer of FIG. 11.
Figure 12B:
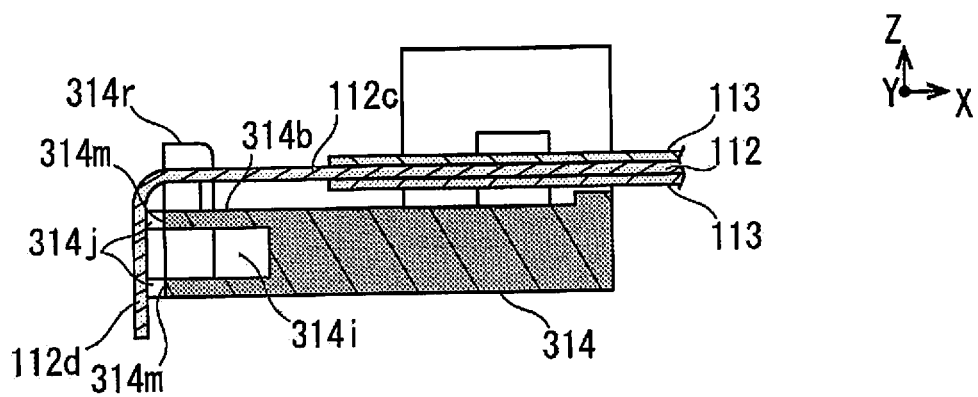
FIG. 12B is a side view illustrating a portion of the unit cell and the first spacer in a cross section along 12B-12B of the first spacer of FIG. 11.

FIG. 11 is a perspective view illustrating a portion (one side along the Y direction) of the first spacer 314 of a second embodiment. FIG. 12A is a side view illustrating a portion of the unit cell 110 and the first spacer 314 in a cross section of the first spacer 314 of FIG. 11 along 12A-12A. FIG. 12B is a side view illustrating a portion of the unit cell 110 and the first spacer 314 in a cross section of the first spacer 314 of FIG. 11 indicated by 12B-12B.

The first spacer 314 of the second embodiment differs from the first spacer 114 of the first embodiment described above in that the first spacer is intermittently provided with support portions 314*k* which support the electrode tab 112 from below along the width direction (Y direction) of the electrode tab 112. The first spacer 114 of the first embodiment described above is provided with the support portion 114*k* that supports the electrode tab 112 from below with an elongated shape along the width direction (Y direction) of the electrode tab 112.

As shown in FIG. 11, the first spacer 314 is provided with supporting portions 314*k*, which project in a rectangular shape from a flat supporting surface 314*b* upward along the Z direction. One of the supporting portions 314*k* is provided at the center of the supporting surface 314*b*, and each of the supporting portions is provided at the two ends of the supporting surface 314*b* along the Y direction. The supporting portion 314*k* at the center of the supporting surface 314*b* has a protruding boss 314*r*. The supporting portions 314*k* support the central portion 112*f* of the electrode tab 112, the one end portion 112*g* thereof, and the other end portion 112*h* thereof along the width direction (Y direction). As shown in FIG. 12A, the first spacer 314 supports the proximal end portion 112*c* of the electrode tab 112 of the unit cell 110 from below by means of the supporting portions 314*k*. On the other hand, as shown in FIG. 12B, there are gaps between the supporting surface 314*b* and the electrode tab 112 of the unit cell 110 in regions where there are no supporting portions 314*k*.

Here, the first spacer 314 greatly suppresses the contact area with the electrode tab 112 at the side surface 314*m* formed by the Z direction and the Y direction by means of a recessed portion 314*i* and a communicating portion 314*j*. Furthermore, the first spacer 314 greatly suppresses the contact area with the electrode tab 112 at the upper surface formed by the X direction and the Y direction by means of the intermittently provided supporting portions 314*k*.

The action and effects of the above-described second embodiment will be described.

The first spacer 314 has the support portions 314K that are adjacent to the recessed portion 314*i* and that partially support the electrode tab 112 along the direction (X direction and Y direction) intersecting the stacking direction (Z direction) of the unit cells 110.

By means of the first spacer 314, it is possible to directly discharge the gas, which is generated in the interior of the recessed portion 314*i* due to the presence of heat, to outside of the recessed portion 314*i* via the communicating portion 314*j*, and to discharge the gas from the communicating portion 314*j* to outside of the recessed portion 314*i* via the air around the supporting portion 314*k* (for example, the gap between the supporting portion 314*k* and the supporting portion 314*k*, which are adjacent to each other and separated along the Y direction). Accordingly, by means of the first spacer 314, the battery pack provided with the first spacer 314, and the method of manufacturing the battery pack provided with the first spacer 314, it is possible to prevent a reduction of the mechanical strength at the welded portion between the bus bar 132 and the electrode tab 112 of the unit cell 110 as well as to sufficiently prevent an increase in the electrical resistance.

Third Embodiment

Figure 13:
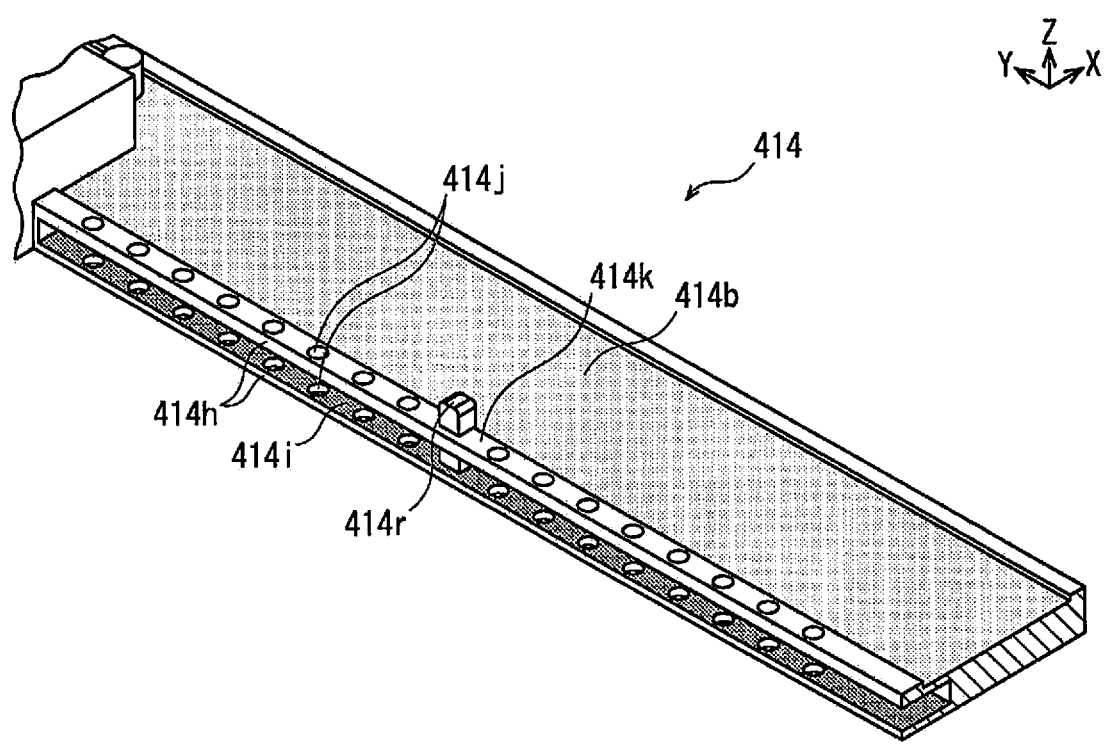
FIG. 13 is a perspective view illustrating a portion (one side along the Y direction) of the first spacer of a third embodiment.

FIG. 13 is a perspective view illustrating a portion (one side along the Y direction) of the first spacer 414 of a third embodiment.

A first spacer 414 of the third embodiment differs from the first spacer 114 of the first embodiment described above in that communicating portions 414*j* that allow the inner side of a recessed portion 414*i* to communicate with the outside of the recessed portion 414*i* are configured by piercing portions so as to be separated from the abutting portion 414*h* along the stacking direction (Z direction) of the unit cells 110 to the recessed portion 414*i*. In the first spacer 114 of the first embodiment described above, the communicating portion 114*j* is formed by notching a portion adjacent to the abutting portion 114*h* so as to be separated from the distal end portion 112*d* of the electrode tab 112.

The communicating portions 414*j* are constituted by cylindrical through-holes that penetrate the supporting portion 414*k* in the Z direction. The communicating portions 414*j* penetrate the recessed portion 414*i* positioned below the supporting portion 414*k* in the Z direction. The communicating portions 414*j* are separated from the abutting portion 414*h* that forms a side surface of the first spacer 414. A plurality of the communicating portions 414*j* are provided in the supporting portion 414*k* at prescribed intervals along the Y direction.

The action and effects of the above-described third embodiment will be described.

In the first spacer 414, the communicating portions 414*j* are configured by piercing portions so as to be separated from the abutting portion 414*h* along the stacking direction (Z direction) of the unit cells 110 to the recessed portion 414*i*.

By means of the first spacer 414, it is possible to provide the communicating portion 414*j* with an extremely simple structure. By providing the communicating portion 114*j*, the first spacer 414 would not increase in size, become troublesome to manufacture, or be subject to increased manufacturing costs. Accordingly, by means of the first spacer 414, the battery pack provided with the first spacer 414, and the method of manufacturing the battery pack provided with the first spacer 414, it is possible to prevent a reduction of the mechanical strength at the welded portion between the bus bar 132 and the electrode tab 112 of the unit cell 110 as well as to sufficiently prevent an increase in the electrical resistance without an increase in size or manufacturing restrictions.

Other than the foregoing, various modifications to the present invention based on the configurations described in the Claims are possible, which also belong in the scope of the present invention.

The invention claimed is:

1. An insulating spacer configured to be used in a battery pack including unit cells stacked on each other in a first direction and electrically connected by a bus bar along the first direction of the unit cells, and each of the unit cells having a cell body including a power-generating element formed in a flat shape and an electrode tab extending out from the cell body in a second direction perpendicular to the first direction with a distal end portion of the electrode tab being bent along a thickness direction of the cell body such that the distal end portion extends substantially along the first direction, and the insulating spacer being configured to be provided between each of the unit cells, the insulating spacer comprising:

a side surface arranged to face in the second direction toward the distal end portion of the electrode tab in an assembled state of the battery pack;

an abutting portion arranged and configured to abut the distal end portion of the electrode tab from the second direction in the assembled state of the battery pack; and a recessed portion that is recessed inward from the side surface in a third direction opposite the second direction so as to open through the side surface and be separated from the distal end portion of the electrode tab in the assembled state of the battery pack, a dimension of the recessed portion in the first direction being smaller than a dimension of the side surface in the first direction such that portions of the side surface exist on both sides of the recessed portion along the first direction where the recessed portion opens through the side surface and the recessed portion is closed on both sides along the first direction; and a communicating portion including a gap that is formed between the side surface and the electrode tab when the abutting portion is abutted against the distal end portion of the electrode tab, the communicating portion communicating between an inside of the recessed portion and an outside of the recessed portion.

2. The insulating spacer according to claim 1, wherein the abutting portion is arranged and configured to abut both end portions of the distal end portion of the electrode tab along a fourth direction that is perpendicular to the first direction and the second direction the fourth direction corresponding to a width direction of the distal end portion of the electrode tab in the assembled state of the battery pack.

3. The insulating spacer according to claim 1, wherein the abutting portion is arranged and configured to abut a portion of the distal end portion that is separated from both end portions of the electrode tab along a fourth direction that is perpendicular to the first direction and the second direction, the fourth direction corresponding to a width direction of the distal end portion of the electrode tab in the assembled state of the battery pack.

4. The insulating spacer according to claim 1, wherein the recessed portion is provided in a region that extends from a position of the abutting portion to a position corresponding to a welding site between the distal end portion of the electrode tab and the bus bar along a fourth direction that is perpendicular to the first direction and the second direction, the fourth direction corresponding to a width direction of the distal end portion of the electrode tab in the assembled state of the battery pack.

5. The insulating spacer according to claim 1, wherein the communicating portion is a notch-shaped portion defined by the abutting portion and the side surface such that the side surface is separated from the distal end portion of the electrode tab when the abutting portion is abutted against the distal end of the electrode tab.

6. The insulating spacer according to claim 1, further comprising a supporting portion that is adjacent to the recessed portion and configured to partially support the electrode tab along the stacking direction of the unit cells.

7. The insulating spacer according to claim 1, wherein the abutting portion protrudes from the side surface in the second direction.

8. The insulating spacer according to claim 7, wherein the side surface is a flat surface that extends in the first direction and a fourth direction perpendicular to the first direction and the second direction, the fourth direction corresponding to a width direction of the distal end portion of the electrode tab in the assembled state of the battery pack.

9. The insulating spacer according to claim 8, wherein a dimension of the recessed portion in the fourth direction is larger than a dimension of the abutting portion in the fourth direction.

10. The insulating spacer according to claim 8, wherein a plurality of abutting portions is provided.

11. The insulating spacer according to claim 10, wherein the plurality of the abutting portions includes at least one pair of the abutting portions, the pair of abutting portions being disposed on the side surface and spaced apart from each other in the first direction such that the abutting portions of the pair are disposed on opposite sides of the recessed portion.

12. The insulating spacer according to claim 11, wherein a plurality of pairs of the abutting portions are provided spaced apart along the fourth direction.

13. The insulating spacer according to claim 12, wherein the recessed portion extends between and beyond the plurality of the pairs of abutting portions in the fourth direction.

14. The battery pack according to claim 1 comprising:
the unit cells;
a plurality of insulating spacers, wherein each of the plurality of insulating spacers is according to claim 1; and
the bus bar,
the unit cells being stacked one atop another along the first direction,
the bus bar that electrically interconnects distal end portions of electrode tabs of different ones of the unit cells.

15. A method for manufacturing the battery pack according to claim 1, the method comprising:
providing a plurality of insulating spacers, wherein each of the plurality of insulating spacers is according to claim 1;
arranging the insulating spacers between the unit cells;
bringing the bus bar into contact with distal end portions of electrode tabs to electrically connect the distal end portions of the electrode tabs of different ones of the unit cells from the third direction; and
irradiating laser light on the bus bar at positions corresponding to positions of recessed portions of the insulating spacers to weld the bus bar and the distal end portions of the unit cells.

* * * * *